(12) United States Patent
Nielsen et al.

(10) Patent No.: US 8,340,588 B2
(45) Date of Patent: Dec. 25, 2012

(54) HANDHELD SYNTHETIC ANTENNA ARRAY (75) Inventors: John Nielsen, Calgary (CA); Gerard Lachapelle, Calgary (CA); Ali Broumandan, Calgary (CA)

(73) Assignee: Her Majesty the Queen in right of Canada as Represented by the Minister of National Defence, Ottawa, Ontario (CA)

( * ) Notice: Subject to any disclaimer, the term of this patent is extended or adjusted under 35 U.S.C. 154(b) by 577 days.

(21) Appl. No.: 12/585,605

(22) Filed: Sep. 18, 2009

(65) Prior Publication Data

US 2011/0070840 A1     Mar. 24, 2011

(51) Int. Cl.
*H04B 17/00* (2006.01)

(52) U.S. Cl. ............... 455/67.11; 455/67.13; 455/562.1; 455/562; 455/63.1; 455/114.2; 455/314; 455/271; 455/254; 342/357; 342/418; 342/372; 342/417; 342/378

(58) Field of Classification Search ............... 455/67.11, 455/314, 63.1, 271, 254; 342/357, 418, 372, 342/417, 378, 13, 359
See application file for complete search history.

(56) References Cited

U.S. PATENT DOCUMENTS

| | | | | |
|---|---|---|---|---|
| 5,557,284 | A * | 9/1996 | Hartman | 342/357.29 |
| 6,084,540 | A * | 7/2000 | Yu | 342/17 |
| 6,771,214 | B2 * | 8/2004 | Kober et al. | 342/357.29 |
| 6,952,460 | B1 * | 10/2005 | Van Wechel et al. | 375/350 |
| 6,985,107 | B2 * | 1/2006 | Anson et al. | 342/451 |
| 7,187,326 | B2 | 3/2007 | Beadle et al. | |
| 7,250,903 | B1 * | 7/2007 | McDowell | 342/357.59 |
| 7,352,721 | B2 | 4/2008 | Kim et al. | |
| 7,505,509 | B2 | 3/2009 | Tsutsui | |
| 2003/0204380 | A1 * | 10/2003 | Dishman et al. | 702/189 |
| 2007/0285315 | A1 | 12/2007 | Davis et al. | |
| 2012/0032854 | A1 * | 2/2012 | Bull et al. | 342/450 |

OTHER PUBLICATIONS

A. Broumandan et al., "Direction of Arrival Estimation of GNSS Signals Based on Synthetic Antenna Array", ION GNSS 2007, Fort Worth, TX, pp. 1-11, Sep. 2007.
T. Pany et al., "Synthetic Phased Array Antenna for Carrier/Code Multipath Mitigation", Proceedings of ENC-GNSS 2008, Toulouse.
Y. Jong and M. Herben, "High-resolution angle of arrival Measurement of the mobile radio Channel", IEEE Trans. Antennas Propagat., vol. 47, No. 11, pp. 1677-1687, Nov. 1999.
Y. de Jong, "Measurement and Modeling of Radio wave Propagation in Urban Microcells", PhD Thesis, Department of Electrical Engineering, University of Technology (EUT), Netherlands, 2001.

(Continued)

*Primary Examiner* — Matthew Anderson
*Assistant Examiner* — Ganiyu A Hanidu
(74) *Attorney, Agent, or Firm* — Brion Raffoul (57) ABSTRACT

A system for estimating parameters of an incoming signal is provided. At least one antenna is coupled to at least one suitable receiver. The antenna(s) are spatially translated in an arbitrary trajectory. As the antenna(s) is being spatially translated, a data processing means samples the incoming signal at set intervals based on a clock signal provided by a system clock. By sampling the incoming signal at different times at different spatial locations on the arbitrary trajectory, the system acts as a synthetic antenna array. The different samplings of the incoming signal at different times and positions provide signal diversity gain as well as different readings which can be used to estimate and/or calculate various parameters of the incoming signal. The different samplings can be used to detect the incoming signal, estimate its angle of arrival, estimate its time of arrival, as well as other parameters.

15 Claims, 7 Drawing Sheets

OTHER PUBLICATIONS

Kwakkernaat et al., "High-Resolution Angle-of-Arrival Measurements on Physically-Nonstationary Mobile Radio Channels", IEEE Transactions on Antennas and Propagation, vol. 56, No. 8, 2008, pp. 2720-2729.

Stergiopoulos et al., "A New Passive Synthetic Aperture Technique for Towed Arrays", IEEE Journal of Oceanic Engineering, 1992, vol. 17, No. 1, pp. 16-25.

Broumandan et al., "Practical Results of High Resolution AOA Estimation by the Synthetic Array", 2008, IEEE VTC Fall Conference, Calgary, Canada, pp. 21-24.

Broumandan et al., "TOA Estimation Enhancement based on Blind Calibration of Synthetic Arrays", 2008, IEEE VTC Fall Conference, pp. 21-14, Calgary, Canada.

Broumandan et al., "Narrowband Signal Detection in Correlated Rayleigh Fading with a Moving Antenna", 2009 13th International Symposium on Antenna Technology and Applied Electromagnetics and the Canadian Radio Sciences Meeting, 2009, pp. 1-4.

Broumandan et al., "Signal Detection Performance in Indoor Environments with a Synthetic Antenna Array", 2009 13th International Symposium on Antenna Technology and Applied Electromagnetics and the Canadian Radio Sciences Meeting, 2009, pp. 1-4.

S. Choi and D. Shim, "A Novel Adaptive Beamforming algorithm for a smart antenna system in a CDMA mobile communication environment", IEEE Trans. Vehicular. Tech., vol. 49, No. 5, pp. 1793-1806, Sep. 2000.

J. Jones et al., "Theory and Performance of the Pulse Aperture Correlator", Proceedings of ION GPS, 2004.

R. Roy and T. Kailath, "ESPRIT—Estimation of Signal Parameters Via Rotational Invariance Techniques", IEEE Transaction on Acoustics, Speech and Signal Processing, vol. 37, No. 7.

A. Moghaddam, "Enhanced Cellular Network Positioning Using Space-Time Diversity", MSc Thesis, Department of Geomatics Engineering, The University of Calgary, Calgary, Canada, 2007.

J. Caffery and G. Stuber, "Subscriber Location in CDMA Cellular Network", IEEE Transactions on Vehicular Technology, vol. 47, No. 2, 1998.

A. Swindlehurst and T. Kailath, "A Performance Analysis of Subspace-Based Methods in the Presence of Model Errors, Part I: The MUSIC Algorithm", IEEE Transactions on Signal Processing, vol. 40, No. 7, Jul. 1992.

A. Swindlehurst et al., "Multiple invariance ESPRIT", IEEE Transactions on Signal Processing, vol. 40, No. 4, Apr. 1992.

S. Charndran, "Advances in Direction of Arrival Estimation", Artech House, 2006.

* cited by examiner

FIGURE 11

# HANDHELD SYNTHETIC ANTENNA ARRAY

TECHNICAL FIELD

The present invention relates to wireless communications. More specifically, the present invention relates to methods and systems for determining and estimating various parameters of, incoming wireless signals using one or two antennas as a synthetic antenna array.

BACKGROUND OF THE INVENTION

The communications revolution of the late 20th and early 21st century has fuelled a need for better, faster, and more useful communications devices. Currently, there is a need for more efficient and more effective methods for determining the parameters of incoming wireless signals. The need is most acute in the wireless communications industry but such technology can also be applied to military uses.

Previously, to ensure proper determination or estimation of the parameters of an incoming signal, various antenna arrays have been used in conjunction with many varied methods. Some of the previous work in this field are as follows, all of the following being hereby incorporated by reference:

H. L. Van Trees, Optimum Array Processing, Part IV of Detection, Estimation, and Modulation Theory, 1st ed., John Wiley Inc, 2002.

S. Charndran, Advances in Direction of Arrival Estimation, Artech House, 2006.

R. O. Schmidt, "Multiple emitter location and signal parameter estimation," IEEE Transactions on Antennas and Propagation, Vol. AP-34, No. 3. 1986, pp. 276-280, March 1986.

R. Roy, T. Kailath, "ESPRIT-Estimation of Signal Parameters Via Rotational Invariance Techniques" IEEE Transaction on Acoustics, Speech and Signal Processing, VOL. 37, NO. 7, 1989.

B., Ottersten, M. Viberg, and T. Kailath, "Performance analysis of the total least squares ESPRIT algorithm," IEEE Transactions on Signal Processing, vol. 39, no. 5, May 1991.

A. L. Swindlehurst, B. Ottersten, R. Roy, T. Kailath, "Multiple invariance ESPRIT," IEEE Transactions on Signal Processing, vol. 40, no. 4, April 1992.

Y. L. Jong and M. Herben, "High-resolution angle of arrival Measurement of the mobile radio Channel," IEEE Trans. Antennas Propagat., vol. 47, no. 11, pp. 1677-1687, November 1999.

Jong, Yvo L. C. de (2001) Measurement and Modeling of Radio wave Propagation in Urban Microcells, PhD Thesis, Department of Electrical Engineering, University of Technology (EUT), Netherlands.

A. Broumandan, T. Lin, A. Moghaddam, D. Lu, J. Nielsen, G. Lachapelle, "Direction of Arrival Estimation of GNSS Signals Based on Synthetic Antenna Array," ION GNSS 2007, Fort Worth, Tex., 25-28 Sep. 2007.

J. Pierre, M. Kaveh, "Experimental Performance of Calibration and Direction-Finding Algorithms," Acoustics, Speech, and Signal Processing ICASSP, 1991.

C. M. S. See, "Sensor Array Calibration in the Presence of Mutual Coupling and Unknown Sensor Gains and Phases," Electronics Letters, IEEE, Vol. 30, No. 5, March 1994.

F. Li, R. J. Vaccaro, "Sensitivity Analysis of DOA Estimation Algorithms to Sensor Errors," IEEE Transactions on Aerospace and Electonic Systems, Vol. 28, No. 3 Jul. 1992.

A. L. Swindlehurst, T. Kailath, "A Performance Analysis of Subspace-Based Methods in the Presence of Model Errors, Part I: The MUSIC Algorithm," IEEE Transactions on Signal Processing, Vol. 40, No. 7, July 1992.

J. C. Liberti JR. and Theodore S. Rappaport, Smat Antennas for Wireless Communication. Prentice Hall TPR, 1999.

S. M. Kay, Fundamentals of Statistical Processing, Volume I: Estimation Theory, Prentice Hall, 1993.

M. Wax, T. Kailath, "Detection of Signals by Information Theoretic Criteria," IEEE Transactions on Acoustics, Speech, Signal Processing, Vol. ASSP-33, pp. 387-392, 1985.

J. J. Caffery, G. L. Stuber, "Subscriber Location in CDMA Cellular Network," IEEE Transactions on Vehicular Technology, Vol. 47, No. 2, 1998.

J. J. Caffery, Wireless Location in CDMA Cellular Radio Systems. Kluwer Academic Publishers, Boston, 2000.

A. Moghaddam, Enhanced Cellular Network Positioning Using Space-Time Diversity. MSc Thesis, Department of Geomatics Engineering, The University of Calgary, Calgary, Canada, 2007.

B. Allen, M. Ghavami, Adaptive Array Systems Fundamentals and Applications, John Wily and Sons, Ltd, 2005.

A. Broumandan, T. Lin, A. Moghaddam, D. Lu, J. Nielsen, G. Lachapelle, "Direction of Arrival Estimation of GNSS Signals Based on Synthetic Antenna Array," ION GNSS 2007, Fort Worth, Tex., 25-28 Sep. 2007.

R. Roy, T. Kailath (1989) "ESPRIT-Estimation of Signal Parameters Via Rotational Invariance Techniques" IEEE Transaction on Acoustics, Speech and Signal Processing, VOL. 37, NO. 7

E. Gonen, M. Mendel, "Application of Cumulants to Array Processing-Part III: Blind Beamforming for Coherent Signals," IEEE Transactions on Signal Processing, Vol. 45, No. 9, September 1997.

J. Jones, P. Fenton, B. Smith, "Theory and Performance of the Pulse Aperture Correlator," Proceedings of ION GPS, 2004.

Parsons, J. D.: 'The Mobile Radio Propagation Channel', (John Wiley & Sons LTD, 2nd ed. 2000)

Rensburg, C., and Friedlander, B.: 'Transmit Diversity for Arrays in Correlated Rayleigh Fading', IEEE Trans. Vehicular Tech., Vol. 53, No. 6, pp. 1726-1734, November 2004

Kim, S.: 'Acquisition Performance of CDMA Systems with Multiple Antennas', IEEE Trans. Vehicular Tech., Vol. 53, No. 5, pp. 1341-1353, September 2004

Choi, S. and Shim D.: 'A Novel Adaptive Beamforming algorithm for a smart antenna system in a CDMA mobile communication environment', IEEE Trans. Vehicular. Tech., Vol. 49, No. 5, pp. 1793-1806, September 2000

Hyeon, S., Yun, Y., Kim, H. and Choi, S.: 'Phase Diversity for an Antenna-Array System with a Short Interelement Separation', IEEE Trans. Vehicular Tech., Vol. 57, No. 1, pp. 206-214, January 2008

Kay, S. M.: 'Fundamentals of Statistical Signal Processing Detection Theory' (Prentice-Hall, Inc, 1998)

Fulghum, T. L., Molnar, K. J. and Duel-Hallen, A.: 'The Jakes Fading Model for Antenna Arrays Incorporating Azimuth Spread', IEEE Trans. Vehicular Tech., Vol. 51, No. 5, pp. 968-977, September 2002

Liberti, J. and Rappaport, T. S.: 'Smart Antennas for Wireless Communications: IS-95 and Third Generation CDMA Applications, Prentice Hall, 1999)

While antenna arrays have been found to be useful, the size of multi-element antenna arrays preclude the use of such devices in current devices. Smaller systems would be useful and can be deployed in current handheld devices.

In signal detection applications, an incoming signal used in terrestrial or indoor wireless communication links typically propagates from the transmitter to a receiver over multiple reflective paths with a with a consequence of a random variation in the complex amplitude of the received signal. When the receiving antenna is located in a diffuse multipath scattering environment, fading appears to be a random function of antenna location conforming approximately to Rayleigh fading statistics with spatial decorrelation intervals of less than the carrier wavelength of the signal. If the receiver uses a single stationary antenna, then a substantial fading margin is required to ensure reliable signal detection. To reduce the fading margin required, the receiver can use multiple spatially separated antennas that exploit either the spatial diversity or beamforming abilities that are inherent properties of discrete antenna arrays. As noted above, multiple element antenna arrays are incompatible with current devices due to their physical size.

One parameter of incoming signals that can be critical is time of arrival. Time Of Arrival (TOA) of a signal is a fundamental observable in most positioning applications. The position of the mobile station (MS) in 3-dimension space can be estimated by four or more independent TOA measurements from base station transmitters that are spatially separated with known locations in the vicinity of the MS. However, the coexistence of the multipath components along with the desired line of sight (LOS) signal component typically causes large errors in the estimation of the TOA observables by the MS which maps into large positional errors. CDMA signaling has a practical advantage of a sizeable bandwidth which allows for partial resolution of the LOS and corrupting multipath components. However, TOA measurement errors on the order of 1 µsec are commonly encountered which typically result in positional errors of several hundred meters. To meet the requirements of applications that require accurate position estimation on the part of the MS, lower deviation and bias of the TOA observables is required. To achieve this requires mitigation of the distortions caused by the existence of the multipath components.

Significant research efforts have been expended on using spatial information from multiple receiver antennas. Classical beam forming and null steering algorithms have been explored which are effective but require an antenna array consisting of multiple antennas which does not fit the form factor of the handheld communications device. In addition, the additional analog signal processing is a limiting factor in this context. There is therefore a need for a solution that has the advantages of antenna array processing but without the unwieldy hardware implications of a multi-antenna array. One option would be a synthetic array consisting of a single low gain antenna conformal with the physical constraints of the handheld MS device. Spatial array processing techniques for single antenna synthetic arrays have been deployed for several decades however, these methods require that the antenna be translated through a trajectory known to the receiver with very good precision. Incorporation of such solutions into a communications handset would require a precision measurement capability in the form of an inertial device. Such an inertial device would be difficult to implement into a handheld device.

Another problem of interest in many signal-processing applications is the estimation of signal parameters from a set of data measurements. High-resolution Angle Of Arrival (AOA) estimation is an important issue in many applications such as radar, sonar, spatial filtering and location estimation specifically enhances the 911 requirement (E-911) in wireless emergency services. There have been several high-resolution AOA estimation methods including the multiple signal classification (MUSIC) and the Estimation of Signal Parameters via Rotational Invariance Techniques (ESPRIT) algorithms. Although the MUSIC algorithm is widely used, it has certain practical implementation issues when compared with ESPRIT. The MUSIC algorithm requires prior calibration of the antenna elements such as the phase, gain as well as the positions of the elements. In addition, a computationally expensive search is required over the processed parameter space. AOA estimation with the MUSIC algorithm requires the exact knowledge of position of the elements. However, the specific array geometry of standard ESPRIT algorithm requires twice the number of sensors in comparison with the MUSIC algorithm.

In particular, applications such as handset-based geolocation estimation and determining direction of interfering signals, portability of receiver is a primary issue generally precluding the use of several antenna elements as required for AOA estimation. To overcome this restriction, antenna array can be synthesized by moving antennas in an arbitrary trajectory. Some researchers have shown an application of using synthetic array with uniform circular array (UCA). They have used UCA-MUSIC based on phase-mode excitation with beam-space processing to determine multipath contributions in wireless mobile propagation environments. In one research implementation, a mechanical lever arm was used to synthesize a circular array by using a single rotating antenna with the constant speed. AOA estimation using a synthetic array has significant advantages because inter channel phases, and gains and mutual coupling between antenna elements do not affect the AOA estimation. However, the basic assumption of synthetic arrays with the MUSIC algorithm, the stationarity of the radio channel, is not always possible in real mobile communication systems.

Several methods have been developed to implement a synthetic array for use in AOA estimation. However, these methods have drawbacks that limit their applicability. As an example, in one implementation, users cannot carry the precise moving motor that one of the methods requires to synthesize the antenna array. It should, however, be noted that using a known constant speed rotating motor comes from the inherent restriction of the MUSIC algorithm (the requirement that the sensor position has to be precisely calibrated). When implementing the MUSIC AOA estimation algorithm, the entire array manifold (phase, gain, and sensor positions) has to be perfectly known. Instead of using a precisely moving motor, other researchers have extended the synthetic array idea by using external sensors, namely Inertial Measurements Units (IMU) which consists of accelerometers and gyroscopes, as a potential solution. Instead of using a predefined array shape, The external sensors are used to estimate the trajectory of the antenna in the synthetic array. Unfortunately, this solution still has issues and shortcomings. Trajectory estimation by the IMU is restricted to the level of accuracy that is dictated by the class of IMU and type of motion of the trajectory. On the other hand, the element position perturbation that the MUSIC algorithm can tolerate depends on the wavelength of the frontwaves. Experimental results obtained by using signals in 1.5 GHz band (20 cm wavelength) revealed acceptable results of trajectory estimation when using medium-cost IMUs. However, such results were only for tightly controlled trajectories which had predefined and gentle motions at a constant speed. Truly arbitrary trajectories were not tested and were noted as being quite difficult to estimate.

Based on the above, there is therefore a need for systems and methods that mitigate if not overcome the shortcomings of the prior art.

SUMMARY OF INVENTION

The present invention provides systems and methods related to wireless communications. A system for estimating parameters of an incoming signal is provided. At least one antenna is coupled to at least one suitable receiver. The antenna(s) are spatially translated in an arbitrary trajectory. As the antenna(s) is being spatially translated, a data processing means samples the incoming signal at set intervals based on a clock signal provided by a system clock. By sampling the incoming signal at different times at different spatial locations on the arbitrary trajectory, the system acts as a synthetic antenna array. The different samplings of the incoming signal at different times and positions provide signal diversity gain as well as different readings which can be used to estimate and/or calculate various parameters of the incoming signal. The different samplings can be used to detect the incoming signal, estimate its angle of arrival, estimate its time of arrival, as well as other parameters.

In a first aspect, the present invention provides a system for determining at least one parameter of an incoming wireless signal, the system comprising:
 at least one antenna
 at least one sensor
 a clock for providing a clock signal
 data processing means
 wherein
 said at least one antenna is spatially translated in an arbitrary trajectory
 said data processing means samples data from said incoming signal at intervals based on said clock signal as said at least one antenna is spatially translated through said arbitrary trajectory
 said data processing means determines said at least one parameter of said incoming signal based on said samples and input from said at least one sensor.

In a second aspect, the present invention provides a synthetic antenna array system for estimating at least one parameter of an incoming signal, the system comprising:
 two antennas for receiving said incoming signal
 a clock for providing a clock signal
 data processing means for processing data from said incoming signal to estimate said at least one parameter
 wherein
 said incoming signal is sampled by said data processing means in specific predefined intervals, said intervals being based on said clock signal
 said two antennas are spatially translated in any arbitrary trajectory while said incoming signal is being sampled.

BRIEF DESCRIPTION OF THE DRAWINGS

The invention will be described with reference to the accompanying drawings, wherein.

DETAILED DESCRIPTION OF THE INVENTION

Figure 1:
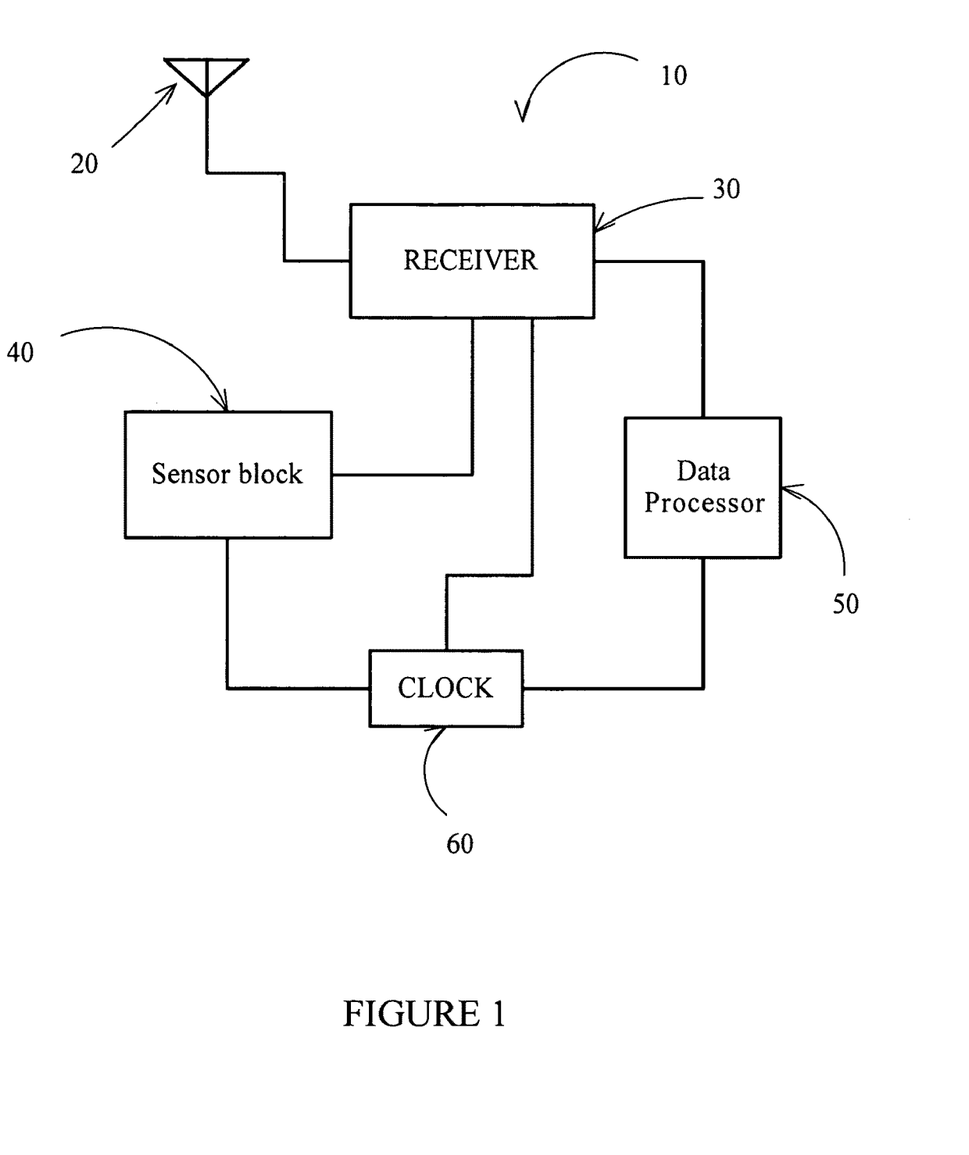
FIG. 1 is a block diagram of a system according to one aspect of the invention.

Referring to FIG. 1, a block diagram of the system 10 is illustrated. As can be seen, the antenna 20 is coupled to a receiver 30. The receiver 30 is coupled to a sensor block 40 as well as to a data processing means 50. A clock 60 provides an internal clock signal to the receiver 30, the sensor block 40, and the data processing means 50. The antenna 20 is spatially translated in an arbitrary (and possibly random) trajectory. As the antenna traverses the trajectory, the data processing means, through the receiver, samples an incoming signal at specific intervals. Whether an interval has passed or not is determined by the clock signal from the clock. The sensor block 40 contains sensors that can provide data regarding the trajectory to the data processing means if the calculations performed by the data processing means requires it. It should be noted that while FIG. 1 shows a single antenna/receiver pair, a doublet or two antennas/receiver pair may also be used as well as other configurations.

In one variant of the system, the incoming signal is continuously sampled in short bursts. In another variant, the signal is despread or processed to obtain samples of the channel gain for the specific signal. In yet another variant, the signal is sampled continuously as the antenna is moved without interruption.

Regarding the system, it is essentially a synthetic antenna array. A synthetic array generally implies a single antenna that is physically translated in space over an aperture interval. The signal collected at the output of this antenna during the interval that it is translated is used in the subsequent signal processor. By weighting the response appropriately an equivalent scanning beam can be created such that the antenna can achieve high directivity commensurate with the physical size of the aperture that the antenna was swept through during data collection.

To achieve this high directivity it is convenient for the antenna to be associated with sensors from which the precise spatial trajectory can be estimated. It is preferred that the estimate of the trajectory to be very accurate to avoid the beam from defocusing. Such sensors are usually based on a combination of GPS (GNSS) and inertial devices such as rate gyros and accelerometers. It should, however, be noted that in other applications, sharp focus is less of an issue. For these applications, diversity gain is sought instead of gain through beam focussing or beam forming.

The synthetic array concept being used in the invention is where a single antenna is swept through a spatial trajectory that is arbitrary and random. Usually the trajectory would be generated by a user sweeping his hand through a smooth arc. However, the trajectory could also be less deliberate motion with the antenna attached to the user's helmet or clothing in some way. Alternatively, the system could be deployed in a handheld form factor with the handset being swept through some smooth trajectory. In another alternative, the system could be co-located with a user inside a moving vehicle or platform.

The system could use sensors or a set of devices used for estimating the trajectory. These would be inexpensive MEMS type accelerometers and rate gyros. Optionally a small CCD camera could be used to augment the sensor array output. Also possible is a GNSS receiver that processes the GNSS signals captured by the antenna.

Also associated with the system is a free running clock typically based on an ovenized crystal oscillator. The oscillator cannot be locked to any reference as the carrier phase of the moving antenna is measured with respect to the phase of this oscillator. In one alternative, there may be a known signal of known direction relative to the antenna trajectory that is a line of sight plane wave signal at the location of the system. In principle the system can jointly determine the trajectory and the clock phase.

The output of the system processing can have a variety of possibilities. However, the general objective is to use the snapshot signal collected to generate at least one parameter or perhaps a set of sufficient statistics such that the desired output parameter can be detected or estimated. For example it may be desired to detect if the signal is present or not as part of a generic signal acquisition scheme. The system may be used to determine the delay of the signal relative to a locally generated reference. It can also be to used estimate the angle of arrival of the signal relative to the estimated trajectory of the antenna.

For time of arrival estimations, the antenna's trajectory need not be estimated as the use of fourth order cumulants simplifies the calculations.

Figure 2:
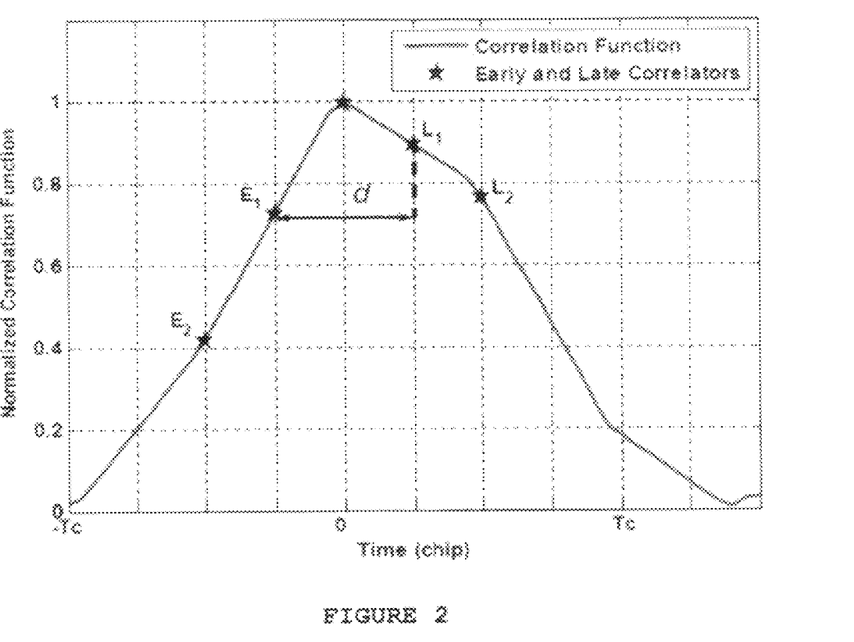
FIG. 2 is a diagram illustrating the use of early and late correlators for estimating time of arrival.
Figure 3:
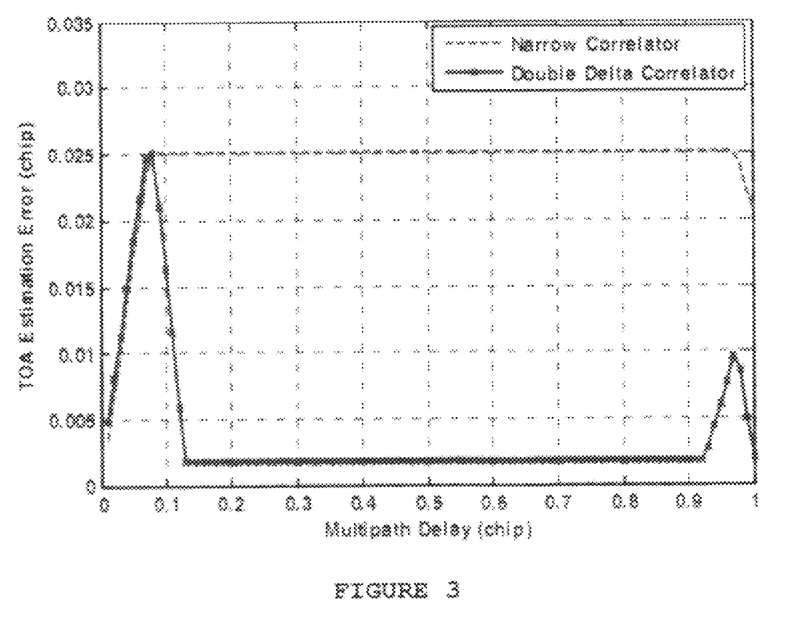
FIG. 3 is a diagram describing the multipath error envelope for narrow and double delta correlators.

Spread spectrum signals, due to their wide bandwidth, are well suited for TOA estimation. One property of Pseudo Random Noise (PRN) sequences used to modulate CDMA signals is that their cross-correlation is almost zero except when the lag is 0. Based on this property, one can estimate the time delay between transmitter and receiver. The correlation function using PRN sequences with a rectangular pulse shape is a triangular shape function with the spread of ±Tc where Tc is the chipping time of the spreading code. The resolution of the conventional correlation method is limited to the sampling rate of the receiver. One possible approach to increase the resolution of the TOA estimation is by using two equally spaced correlators called early and late correlators which is shown in FIG. 2 by $E_1$ and $L_1$ respectively. By comparing the early and late correlator power of the correlation function, one can estimate the exact TOA in the absence of multipath and noise with an ideal receiver response. A double delta correlator utilizes two pairs of correlators rather than one to estimate the LOS (line of sight) signal delay by compensating the multipath influence significantly. If multipath signal exists with the LOS signal, the TOA estimation from standard correlation methods will be influenced by multipath, since the magnitude of the rising edge slope is different to the one of the falling edge in the autocorrelation peak. The basic idea of double delta correlator is to introduce a correction term, which can compensate for the slope difference between the rising and the falling edge due to multipath. FIG. 2 shows the correlation function, and the early and late points. The following derivation represents the correction term to the conventional correlation function based on the double delta correlator concept.

$$\tau = \frac{[2\cdot(E_1 - L_1) + (E_2 - L_2)]}{(E_1 - E_2 + L_1 - L_2)} \frac{d}{2} \quad (1)$$

where d is early and late correlator spacing and t gives the correction term. To evaluate the performance of early-late TOA estimators, multipath error envelop is a common curve to demonstrate the performance of different approaches in presence of multipath propagation. FIG. 3 describes the multipath error envelop for narrow and double delta correlator.

There is just one multipath component with 3 dB attenuation and correlator spacing, d, is 0.1 chip. Based on the results of FIG. 3, the multipath propagation can cause up to 0.025 chip error in TOA estimation. All early-late TOA estimators, including narrow correlators and double delta correlators, try to estimate the correct position of the correlation peak based on the triangular shape of the auto correlation function. In the absence of multipath propagation, these methods are the best options in terms of complexity and accuracy.

Figure 4:
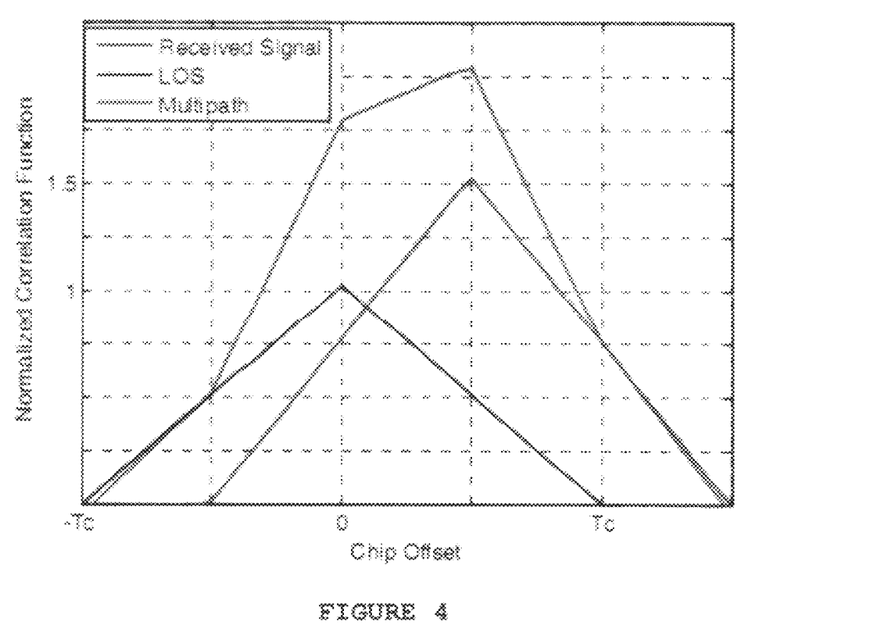
FIG. 4 is a diagram illustrating the situation where there is one multipath component in a TOA estimation.
Figure 5:
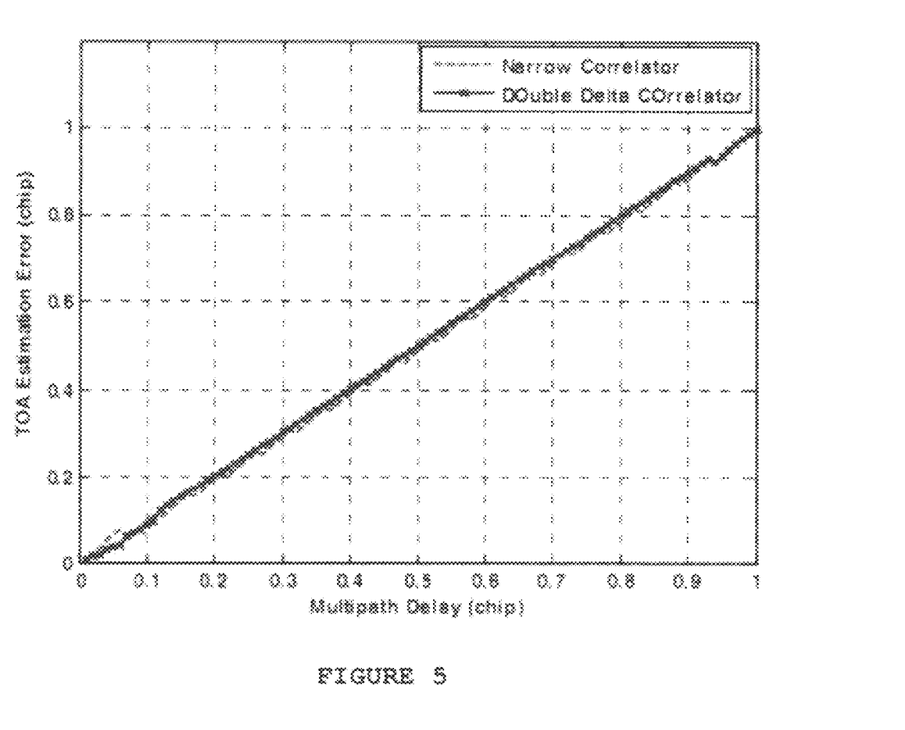
FIG. 5 shows the multipath error envelope of the narrow and double delta correlators shown in FIG. 4.

The performances of the early-late correlators are usually evaluated in the presence of one multipath component with weaker signal power with respect to the LOS signal. The limitation of the early-late correlators comes into view when there are several multipath components. Consider the situation where individual multipath components has stronger energy than the LOS signal (e.g. indoor environments) or the combination of sub-chip multipath signals has stronger energy than the LOS signals (e.g. in indoor, urban, and under foliage). In these cases, the estimated TOA by all peak estimator techniques (i.e. conventional correlator, early-late correlator) becomes wrong. The TOA estimation error depends on the delays of multipath components with respect to the LOS signal. The errors can be in the order of one chip. FIG. 4 shows the situation where there is one multipath component. The multipath signal is stronger than the LOS component and has one chip delay from the direct signal. The peak of the correlation function shown in FIG. 4, belong to the multipath component. All peak-based TOA estimation techniques consider the highest point of the correlation function as a rough estimate of the LOS signal which is off by one chip from LOS component. FIG. 5 shows the multipath error envelop of the narrow and double delta correlators for the situation described in FIG. 4. FIG. 5 shows that the strong multipath component destroys the performance of correlation based TOA estimators.

To formulate the signal model, consider a multipath wireless channel scenario, in which the desired signals form different paths to a receiver. These signals are received by an M-element synthetic array with an unknown array geometry. One can assume N narrowband signals which includes the direct signal and several delayed and attenuated replicas of line of sight (LOS) signals. By narrowband, it should be noted that it is meant that the reciprocal of the baseband bandwidth is much longer (in time) than the time delay across any two points of the antenna's trajectory. The measurement system is corrupted by additive noise with an unknown spatial correlation matrix. The M array output vector can be shown by $$x(t)=As(t)+n(t) \tag{2}$$

where $$A=[a(\theta_1),a(\theta_2),\ldots,a(\theta_K)]$$

$$s(t)=[s_1(t),s_2(t),\ldots,s_N(t)] \tag{3}$$

A is M×N unknown steering matrix. s is the N×1 signal vector where s1(t) corresponds to the desired signal. n is an additive noise vector at the antenna elements and could be Gaussian, non-Gaussian, or a combination of Gaussian or non-Gaussian vectors.

Spacing between each elements of the synthetic antenna array is preferably less than half a wavelength of the impinging wave-fronts to mitigate aliasing. However, any spacing can be considered. With spacing less than half a wavelength of the impinging wavefronts, the samples are spatially correlated. If the spacing is greater than the half wavelength, the samples tend to become uncorrelated. If, on the other hand, the system is used mainly for estimating the angle of arrival, then the half a wavelength limitation is preferred.

Figure 6:
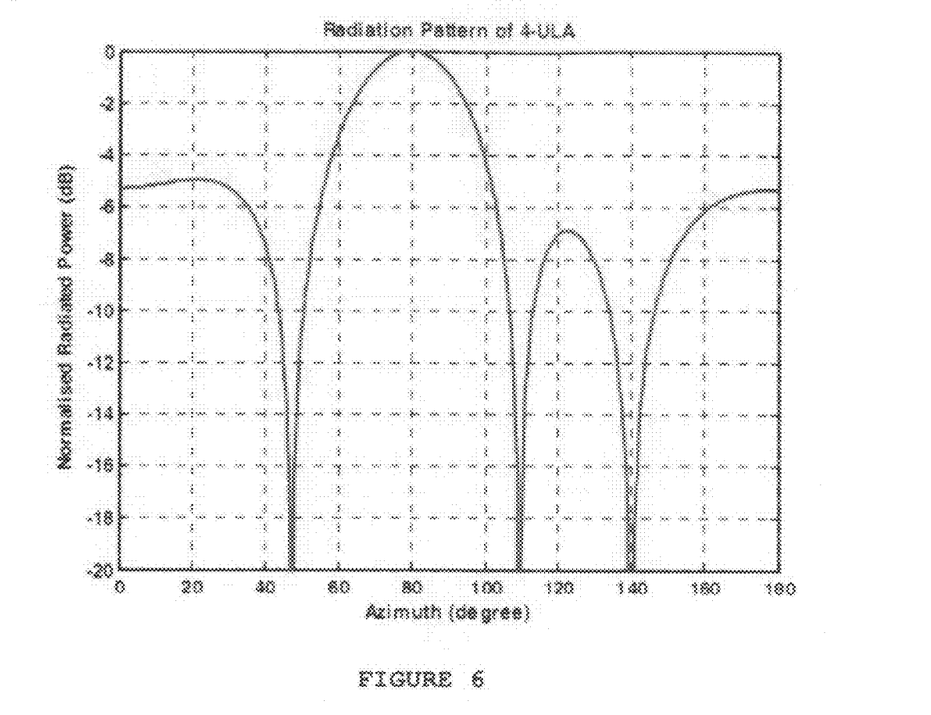
FIG. 6 is a diagram showing the radiation pattern of a 4-element Uniform Linear Array.

In beamforming techniques, the sensor outputs are weighted with specific coefficients to pass desired signals without distortion, while mitigating the effects of the interference and undesired signals. In delay estimation applications, it is critical to mitigate the effects of multipath and jammer signals as shown in previous section. Consider a situation where field signals are measured by a 4-element Uniform Linear Array (ULA). In this case, based on the beamforming techniques by coherently combining the spatial samples of desired signal and uncorrelated multipath component assumption in different antennas, a 6 dB gain is achievable in the direction of the desired signal. However, unwanted signals are uncontrolled in this scheme. As it was shown in the previous section, multipath mitigation is as important as enhancing the desire signal. FIG. 6 represents the radiation pattern of a 4-element Uniform Linear Array (ULA) when the main beam steers at 80 degree, and one null steers to 140 degree. This figure shows that more than 20 dB rejections are achievable for signals arriving from unwanted direction. Therefore, by utilizing null-steering technique a deep null can be placed in direction of multipath and interference signal.

Consider A as the steering matrix of the array. Assume s1(t) is the desired signal which should be recovered without distortion and $\{a(\theta_2),\ldots,a(\theta_K)\}$ represents the unwanted signals. The beamforming and null-steering weights, which pass desired signal without distortion and attenuate unwanted signals can be defined as $$w^H=cA^H(AA^H)^{-1} \tag{4}$$

where c is the 1×N vector $$c=[1,0,\ldots,0] \tag{5}$$

The following describes the modified version of cumulant based blind steering estimation adopted for TOA estimation algorithm with CDMA signals. Consider a CDMA signal structure, which utilizes an orthogonal Pseudo Random Noise (PRN) code for modulating the transmitted signals.

Due to using orthogonal codes, the only remaining signals after the de-spreading process is the desired signal and several of its replicas. We are assuming here that the desired signal and multipaths components are correlated but not coherent (i.e. they are partially correlated) and for the number of impinging signal including LOS and multipaths, N is less than the number of sensor elements M (N<M). The main goal herein is that of extracting the desired signal embedded in interference signals and multipath propagation. To use beamforming and null-steering noted above, one has to estimate the signal steering matrix, A. Due to the correlated multipath propagation without any knowledge of the array geometry or of the calibration coefficients, it is difficult to estimate the desired signal steering vector using second order statistics. Fourth order cumulants are used for estimating the steering vector. The fourth-order cumulant matrix $C_1$ can be defined as:

$$C_1 = cum(x_i(t), x_i^*(t), x(t), x(t)^H) \tag{6}$$

$$= \sum_{i=1}^{N} \mu_{4,s_i} |A(l,i)|^2 a_l a_i^H = A\Lambda A^H$$

where $x_i(t)$ are the outputs of the ith sensor and x(t) is the array output. A is the array steering matrix, $\mu_{4,ui}$ are the signal fourth order cumulants and $$\Lambda=diag(\mu_{4,s_1}|A(1,1)|^2,\ldots,\mu_{4,s_N}|A(1,N)|^2)$$

Where cum is the fourth order cumulants which can be defined as $$\mu_{i,j}^{k,l} = cum(x_i(t), x_j^*(t), x_k(t), x_l^*(t)) \tag{7}$$

$$= E\{x_i(t)x_j^*(t)x_k(t)x_l^*(t)\} - E\{x_i(t)x_j^*(t)\}E\{x_k(t)x_l^*(t)\} -$$

$$E\{x_i(t)x_k(t)\}E\{x_j^*(t)x_l^*(t)\} - E\{x_i(t)x_l^*(t)\}E\{x_j^*(t)x_k(t)\}$$

Similarly, C2 can be represented by $$C_2 = cum(x_2(t), x_i^*(t), x(t), x(t)^H) \tag{8}$$

$$= \sum_{i=1}^{N} \Upsilon_{4,s_i} A(2,i)A^*(1,i)a_i a_i^H$$

$$= AD\Lambda A^H$$

where $$D = diag\left(\frac{A(2,1)}{A(2,1)},\ldots,\frac{A(2,N)}{A(1,N)}\right)$$

It should be noted that it is possible to estimate A and D matrices within a complex constant by the rotational invariance property (originally introduced for the ESPRIT algorithm as will be explained below). In fourth order cumulants based blind steering estimation, the rotational invariance property is achieved without any need of the identical copy of the array. Steps toward blind steering matrix estimation can be shown as 1) Estimate M×M cumulant matrix $$C_1=cum(x_1(t),x_1^*(t),x(t),x(t)^H)$$

$$C_2=cum(x_2(t),x_1^*(t),x(t),x(t)^H) \tag{9}$$

2) Put the C1 and C2 matrix into a 2M×M matrix C as $C=[C1\ C2]^T$

3) Perform SVD (singular value decomposition) of C. Replace the first 2M×N submatrix of the left singular vector of C into matrix $U_1$.

4) Partition U1 into two M×N matrices U11 and U12

5) Perform SVD of $[U_{11},U_{12}]$ and keep the last N right singular vectors and put it into 2N×N matrix defined by F 6) Partition F into two N×N matrices $F=[F_x,F_y]^T$ 7) keep the eigenvector, E and eigenvalues, $\Lambda$ of the $-F_x F_y^{-1}$ matrix 8) the following relation gives the steering matrix within a diagonal matrix.

$$A = \frac{1}{2}\Psi(U_{11}E + U_{12}E\Lambda^{-1}) \quad (10)$$

where $\Psi$ is an arbitrary diagonal matrix.

This TOA estimation method can be summarized as follows:

1) Estimate the signal space dimension (sophisticated approach such as AIC and MDL can also be used)

2) Estimate the steering matrix based on the blind fourth order cumulants

3) Steer the main beam of the beamformer to the first estimated steering vector and place nulls in direction of other estimated steering vectors 4) Repeat step 3 for all estimated steering vectors by changing c in equation (5) above.

5) Compare all possible correlation function described in step 3 and 4 and choose the one with minimum propagation delay as the desired signal.

Figure 7:
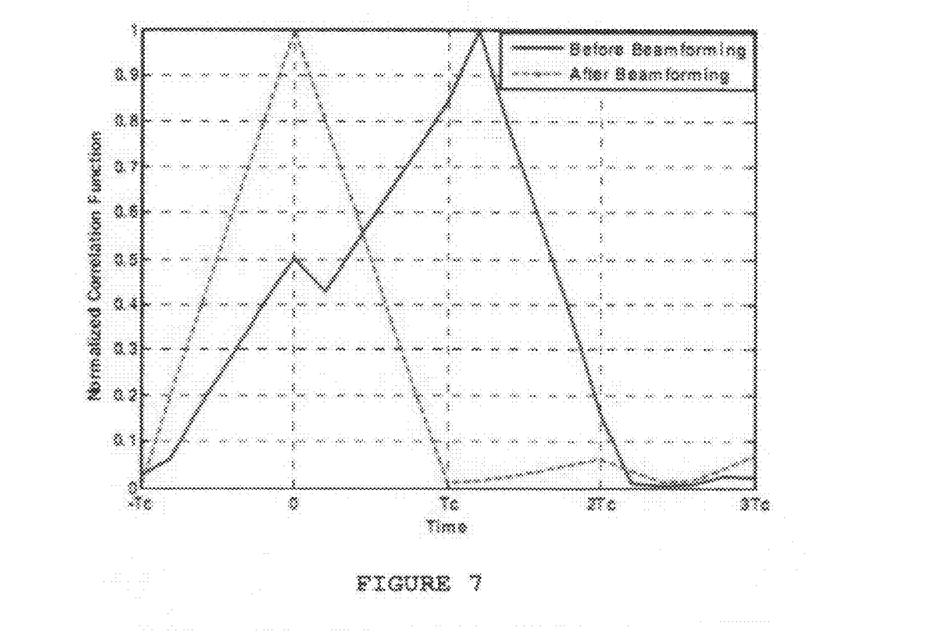
FIG. 7 is a diagram illustrating the correlation function before and after applying beamforming and null-steering when performing a TOA estimation.

Steps 4 and 5 are performed to detect the LOS component by assumption that the LOS signal arrives before multipath components and has minimum propagation delay (presence of the LOS signal is assumed). The correlation function before and after applying beamforming and null-steering technique is shown in FIG. 7. The solid curve represents the correlation function of the received signal which composed of two components: LOS and multipath. The multipath component has 3 dB more power than the LOS signal and arrives with 1.2 chip delay respect to the LOS signal. The estimation TOA based on the correlation peak has approximately 1.2 chip error. The dashed curve in FIG. 7 represents the normalized correlation function after beamforming and null-steering process. The null-steering process completely removed the multipath component so the remaining signal is LOS.

For signal detection applications, experiments have shown that spatially translating a single antenna in an arbitrary trajectory while sampling the incoming signal (to provide a synthetic antenna array) provides calculation gains versus a single stationary antenna. The calculations for the probability for false alarm detection and for a positive detection are provided below.

Assume that the phase center of the single antenna is coincident with a point in a three-dimensional spatial coordinate system identified by the position vector p. The complex baseband signal representation of the antenna output received signal is denoted as r(t). This signal snapshot is processed to decode between the $H_0$ and $H_1$ states. Under the $H_0$ state, the signal is not available and under the $H_1$ state the signal and noise are available. Under H1 the signal component of r(t) is denoted as s(t,p) which is a function of time t and the antenna position p. This signal is expressed as $s(t,p)=A(p)s_o(t)$ where $s_o(t)$ is the deterministic (pilot) complex baseband component of the signal that is known to the receiver and A(p) is the channel gain. The received signal is corrupted with additive noise which has an equivalent complex baseband representation denoted by w(t). It is assumed that w(t) is a circularly normal random process, independent of the signal and has a power spectral density (PSD) that is constant within the bandwidth of $s_o(t)$. The conditional representations of r(t) for a stationary antenna located at p is expressed as $$r(t)|_{H1} = A(p)s_o(t)+w(t)$$

$$r(t)|_{H0} = w(t) \quad (11)$$

The receiver accumulates a temporal snapshot of r(t) over the snapshot interval of $t\in[0,T]$ as introduced beforehand. Based on the Rayleigh fading assumption, A(p) is a zero mean circularly normal random variable such that $A(p)\sim CN(0,\sigma^2_A)$ where $\sim$ denotes the PDF of the left hand side variable and $CN(0,\sigma^2)$ signifies a circularly normal PDF of mean $\mu$ and variance $\sigma^2$. As $s_o(t)$ is known to the receiver, A(p) is circularly normal and w(t) is spectrally white within the bandwidth of $s_o(t)$, the optimal Neyman Pearson (NP) detection processing is a matched filter based on correlation with $s_o(t)*$ followed by a magnitude squared operation where $||*$ represents the complex conjugate operator. This processing results in the decision variable denoted as $z_0$ which is expressed as $$z_0 = |x_T|^2 = \int_0^T r(t)s_o(t)^* dt \quad (12)$$

where the intermediate variable $x_T$ is defined for convenience.

The signal energy of $s_o(t)$ is normalized such that $$\frac{1}{T}\int_0^T |s_o(t)|^2 dt = 1$$

Since $$\int_0^T w(t)s_o(t)^* dt \sim CN(0, TN_o)$$

the average SNR $\rho$ can be represented as $$\rho \equiv \frac{T\sigma_A^2}{N_o} \quad (13)$$

This definition will be used in subsequent discussions Without loss of generality, the normalization of $TN_o=1$ can be imposed such that $\rho=T^2\sigma^2_A$, which simplifies the expressions to follow.

To determine the probabilities of a false alarm ($P_{fa}$) and of a positive detection ($P_{det}$) for a stationary antenna, (where $\gamma$ is a threshold)

$$P_{fa} = \exp(-\gamma),$$

$$P_{det} = \exp\left(\frac{-\gamma}{1+\rho}\right) \quad (14)$$

If one uses a synthetic array where the antenna is moved along an arbitrary trajectory while the snapshot data is being collected, the position vector to the antenna location at time t from the origin is now denoted as p(t). The signal component of the complex baseband signal r(t) is written as s(t,p(t)) which is a function of time, t and the antenna position, p(t) which in turn is a function of t.

If one were to compare the synthetic array case with the case for a stationary antenna, the constraint T=MΔT will be imposed. Define $t_m$ as the starting instance of the $m^{th}$ subinterval that extends over the interval of $[t_m, t_m+\Delta T]$ for m∈[1, 2, ..., M]. ΔT is considered to be sufficiently small such that A(p(t)) can be approximated as constant over the interval of ΔT. The signal captured in each subinterval is correlated with $s_o(t)$ resulting in a set of M spatial array samples denoted by $x_m$ and given as and given as $$x_m = A(P(t_m))s_m + w_m \quad (15)$$

where $$s_m = \int_{t_m}^{t_m+\Delta T} |s_o(t)|^2 dt \quad (16)$$

$$w_m = \int_{t_m}^{t_m+\Delta T} w(t)s_o(t)^* dt$$

it follows that $x_m$ forms a set of sufficient statistics of the accumulated snapshot signal in terms of optimal decoding between $H_0$ and $H_1$. After some manipulation, and removing deterministic scaling and additive constants in the uncorrelated signal environment, the Likelihood Ratio Test (LRT) reduces to $$z_I = \Sigma_{m=1}^{M} |x_m|^2 \quad (17)$$

which is normally referred to as the equal gain combiner.

The $P_{fa}$ and $P_{det}$ can be determined for a threshold γ as $$P_{fa} = Q_{\chi^2_{2M}}(\gamma) \quad (18)$$

and $$P_{det} = Q_{\chi^2_{2M}}\left(\frac{\gamma}{\frac{\rho}{M}+1}\right) \quad (19)$$

where $P_{fa}$ is the probability of a false alarm and $P_{det}$ is the probability of a true detection of the incoming signal.

The target detection parameter $P_{fa}$ is used in equation (18) to determine the threshold γ. This is used in equation (19) with the target parameter $P_{det}$ to determine the average SNR, ρ, required.

Given target detection parameters $P_{fa}$ and $P_{det}$, the average SNR required for the stationary and moving antenna, denoted as $\rho_s$ and $\rho_m$ respectively, can be evaluated.

Figure 8:
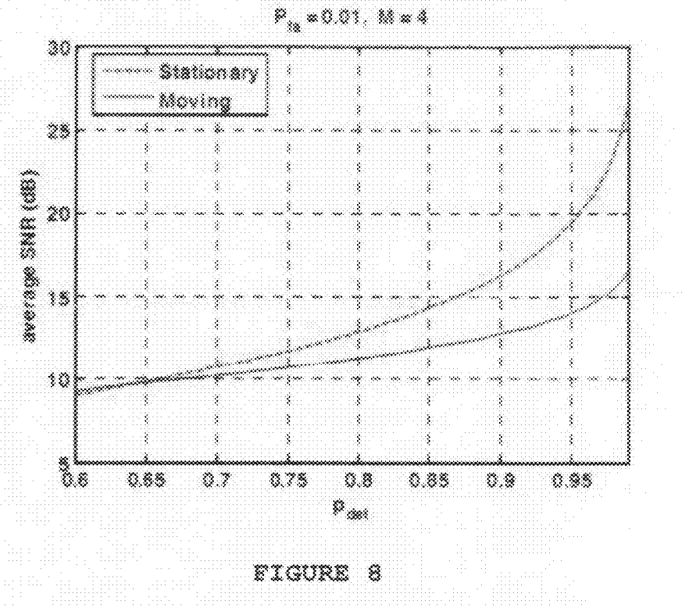
FIG. 8 illustrates the average SNR required for stationary and moving antennas for signal detection.
Figure 9A:
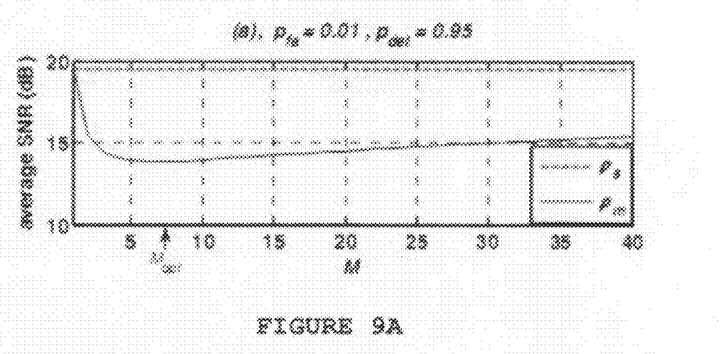
FIG. 9A shows average SNR as a function of M when detecting signals using one aspect of the invention.

FIG. 8 shows $\rho_s$ and $\rho_m$ as a function of the target parameters $\{P_{fa}, P_{det}\}$ with $P_{fa}$=0.01 for M=4. Consistently for larger values of $P_{det}$, $\rho_m$ is less than $\rho_s$, demonstrating the advantage of the synthetic array compared to the stationary antenna. Also evident in FIG. 8 is that this advantage decreases as $P_{det}$ is reduced. When $P_{det}$ is sufficiently low, $\rho_s$ is less than $\rho_m$ indicating that moving the antenna may be detrimental to performance. However, the range where $\rho_s < \rho_m$ is of negligible practical significance as $P_{det}$ is so low. FIG. 9A shows the average SNR as a function of M with the interesting observation that there is a global minimum. There is therefore an optimum value of M for which $\rho_m$ is minimum and this is denoted as $M_{opt}$.

Figure 9B:
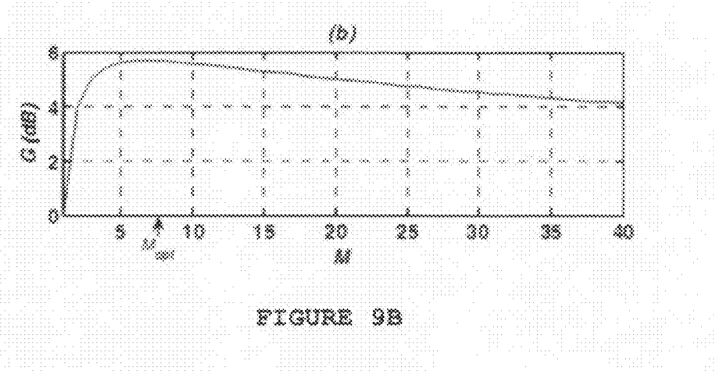
FIG. 9B illustrates G as a function of M when detecting signals using one aspect of the invention.

It is convenient to define $G=\rho_s/\rho_m$ as the processing gain of the synthetic array antenna processing relative to the stationary antenna processing. In FIG. 9B, G is plotted as a function of M for the corresponding case represented in FIG. 9A. As expected G has a global maximum at $M_{opt}$ emphasizing the optimum choice of M. For this analysis, uncorrelated samples of the channel gain were assumed. This implies that the trajectory is large enough that it can accommodate $M_{opt}$ uncorrelated channel samples.

Figure 10A:
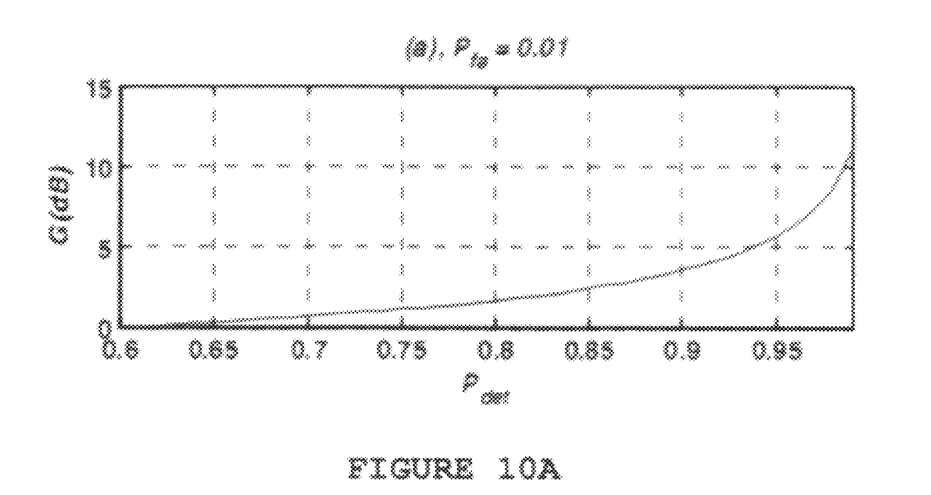
FIG. 10A illustrates the optimal value for G as a function of the probability of a successful detection for a fixed probability of a false alarm.
Figure 10B:
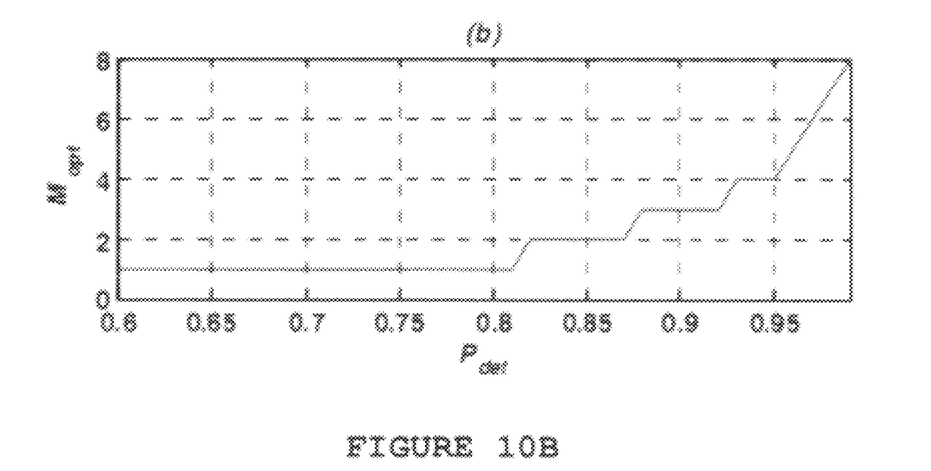
FIG. 10B illustrates the corresponding value for an optimum M.

As M is increased for the moving antenna, the diversity gain increases. However, the incremental diversity gain also decreases to small values as M becomes large. As M is increased, the coherency of the snapshot signal is reduced as each of the M subinterval components constituting the overall snapshots are essentially noncoherently combined. This eventually becomes the dominant loss factor as M becomes larger. The consequence of these factors is the existence of an optimum value for M. FIG. 10A shows the optimal value of G as a function of $P_{det}$ for a constant $P_{fa}$. As indicated earlier, G increases as $P_{det}$ is increased which is due to the increased significance of diversity gain as the target $P_{det}$ is increased. This is equivalent to the increased significance of the diversity gain for lower BER in communication systems. FIG. 10B shows the corresponding value of $M_{opt}$ with the interesting observation that $M_{opt}$ increases significantly for larger $P_{det}$. This implies that the trajectory of the antenna has to be larger to achieve more uncorrelated spatial samples of the channel gain. Note from FIG. 10A that an optimal G of 11 dB gain is attainable when $P_{det}$=0.99 which is a practical target specification. $M_{opt}$ for this case is eight, which maps into a reasonable trajectory size for carrier frequencies in the 1 to 2 GHz range.

For angle of arrival (AOA) estimations, an ESPRIT based method, using a two-antenna (doublet) receiver is disclosed below. While this scheme removes the necessity for any mechanical moving motors or external aiding sensors, experiments have shown that a sensor that tracks the vector between the two antennas improves the estimated AOA.

For this scheme, the doublet (two-antenna system with separate receivers for each antenna) is spatially translated in an arbitrary trajectory.

For this AOA estimation scheme, we can assume K impinging signals from K different locations being received by an arbitrary geometry array with M sensors. Signals could be samples of a stationary random stochastic process or be a deterministic function of time. Signals are narrow-band processes whose source bandwidth is smaller than the reciprocal of the time delay along the array. Far-field sources are assumed, which there are not coherent (perfectly correlated). Consequently, the received signal is a combination of the LOS and reflected plane wave signals. The number of incoming signals are less than the number of the sensors (K<M). The received vector signals can be represented by:

$$x(t) = A(\theta)s(t) + w(t) \quad (20)$$

where x(t) is an M×1 observation vector, s(t) denotes the vector of complex signal envelop at time t. A is an M×K steering matrix for signals coming from direction θ={$\theta_1$, $\theta_2$, ..., $\theta_K$}.

$$A(\theta) \stackrel{def}{=} [a(\theta_1), a(\theta_2), ..., a(\theta_k)] \quad (21)$$

w(t) is spatially and temporally white Gaussian noise with variance of $\sigma^2$.

The correlation matrix of the observation vector is $$R_x = AP_s A^H + \sigma^2 I \tag{22}$$

where $P_s$ is the signal correlation matrix and I is an M×M identity matrix.

For this discussion, superscript H indicates complex conjugate transpose, T denotes the transpose operator, and * indicates complex conjugate.

While there are several versions of the ESPRIT algorithm, in this discussion the Total Least Square (TLS) version of the ESPRIT algorithm will be used. The ESPRIT algorithm exploits a specific array geometry. For simplicity consider a planar array consist of M doublets (pairs of antennas) with arbitrary geometry and phase and gain response. The sensors in each doublet have the same pattern characteristics. The intra doublet element spacing is identical for all doublets. In addition, the connection axes of intra-doublet sensors are parallel for all doublets (translation invariance property). The array configuration of the ESPRIT algorithm can be represented by two sub-arrays which each doublet has a member in each sub-array. Each sub-array is the replica of the other one by the known physical displacement d. In this scenario, each sub-array consists of sensors with arbitrary phase and gain characteristics.

The output of each doublet can be represented by the equation below:

$$x_1(t) = As(t) + n_1(t)$$

$$x_2(t) = A\Psi s(t) + n_2(t) \tag{23}$$

where s(t) is the signal vector and $n_1(t)$ and $n_2(t)$ are noise samples in each sub-array. $\Psi$ is defined as a K×K matrix that relates the measurement from the first sub-array to the other one and contains the AOA information $$\Psi = \text{diag}\left\{ e^{\frac{j2\pi d}{\lambda}\sin\theta_1}, \ldots, e^{\frac{j2\pi d}{\lambda}\sin\theta_K} \right\} \tag{24}$$

$\lambda$ is the wavelength of the impinging signals and $\theta$ is the AOA of arrival signals relative to the doublets connection vector. Therefore, the AOA can be extracted by estimating the $\Psi$ matrix. Combining the outputs of the sub-arrays to a single array yields $$y(t) = \begin{bmatrix} x_1(t) \\ x_2(t) \end{bmatrix} = \begin{bmatrix} A \\ A\Psi \end{bmatrix} s(t) + \begin{bmatrix} n_1(t) \\ n_2(t) \end{bmatrix} = A's(t) + n'(t) \tag{25}$$

The ESPRIT algorithm relies on the estimation of the signal sub-space. The signal sub-space can be estimated through eigen analysis of the correlation matrix defined by $$R_y = A'R_s A'^H + \sigma^2 I \tag{26}$$

The K eigenvector corresponding to the K largest eigenvalues span the signal subspace $E_s = \{e_1, e_2, \ldots, e_K\}$. $E_s$ can be represented by $$E_s = \begin{bmatrix} E_{x_1} \\ E_{x_2} \end{bmatrix} \tag{27}$$

The range of $E_s$ is equal to the range of A' so that there exists a nonsingular matrix T to satisfy $E_s = A'T$. By defining $F = E_{x_1}^\# E_{x_2}$ where $E_{x_1}^\#$ represents the pseudo inverse of $E_{x_1}$ it can be shown $$\Psi = TFT^{-1} \tag{28}$$

Therefore, the AOA can be estimated from the eigenvalues of F. The proof of TLS ESPRIT algorithm is extensively described in the literature. The steps toward AOA estimation by the ESPRIT algorithm can be summarized as follows:

1) Estimate the correlation matrix from N independent measurement
2) Calculate the signals subspace dimension
3) Estimate the signal subspace $E_s$ from partitioning the eigenvectors
4) Compute the eigenvectors of $$\begin{bmatrix} E_{x_1}^* \\ E_{x_2}^* \end{bmatrix} [E_{x_1} \mid E_{x_2}] = E\Lambda E^* \tag{29}$$

and partition E.

$$E = \begin{bmatrix} E_{11} & E_{12} \\ E_{21} & E_{22} \end{bmatrix} \tag{30}$$

5) Estimate the eigenvalues $\hat{\phi}_k$ of $\Phi = -E_{12}E_{22}^{-1}$
6) The AOA can be estimated by $$\hat{\theta}_k = \sin^{-1}\{arg(\hat{\phi}_k)\lambda/2\pi d\} \tag{31}$$

Equations (14) and (18) reveal that for AOA estimation with the ESPRIT algorithm, array manifold information is not required. This property has several benefits, which are listed below.

P1) array calibration is a critical procedure in high-resolution AOA estimation. Several articles in the literature have discussed methods to mitigate phase and gain differences among different channel of the sensor arrays. In the ESPRIT algorithm context, the calibration process is just limited to the doublet phase, gain adjustment. Experimental results showed that AOA estimation by the ESPRIT algorithm is not sensitive to the gain differences. This decreases the number of parameters to be estimated.

P2) Equation (18) is a key relationship in developing of the ESPRIT algorithm which suggests that eigenvalues of F is equal to the diagonal elements of $\Psi$. The estimated AOA only depends on intra-doublet element spacing d and not on inter-doublet spacing. This property increases the flexibility of the array geometry and array aperture extension with the fixed number of sensors.

The specific properties of the ESPRT algorithm make it a proper candidate for AOA estimation with the synthetic antenna array. In this case, just one doublet (two sensors with constant spacing during data collection) is required for synthesizing the whole array. During the data collection, the receiver collects spatial and temporal samples. The only constraint in synthetic ESPRIT algorithm is the translational invariance moving of a doublet. Neither rotating with mechanical motor nor external sensors is required for a synthetic ESPRIT array. The important assumption in AOA estimation with the synthetic MUSIC algorithm is stationarity of the communication channel. In actual cases, the stationarity of communication channels due to passing vehicles and movements of trees is impossible. One more advantage of ESPRIT algorithm over MUSIC algorithm in implementations using a synthetic array is that the ESPRIT algorithm assumes sensors in different doublets have various patterns. Time varying multipath channel in the presence of direct signals can be modeled by phase and gain differences in different doublets. Therefore, a synthetic array implementation of the ESPRIT algorithm is more suitable than a synthetic array MUSIC algorithm implementation when in the presence of time varying channels.

Experimental setups to test the AOA estimation method used specific configurations of equipment. Pilot signals of downlink channel of CDMA IS-95 standard continuously broadcasts a known signal to provide Mobile Stations (MSs) a robust time, frequency, and phase reference for demodulation in other channels. The pilot channel has no data modulation and consists of only in-phase and quadrature phase pseudorandom noise (PRN) codes. Due to the higher power of the pilot channel with respect to other channels, signals of pilot channels are preferred for AOA estimation purposes. All BSs use the same PRN code, distinguished by the different code offsets. The receiver is tuned to capture CDMA signals with the bandwidth of 1.25 MHz modulated by 1.2288 Mchip/s PRN sequence with the period of 215 chips at 1947.5 MHz.

Signals received at antennas are amplified, filtered, down-converted and sampled. In order for BS detection for comparing AOA estimation results with the real angle between antenna array and BSs, GPS time synchronization is necessary. In CDMA IS-95 cellular networks, all BSs are synchronized with the GPS 1 Pulse Per Second (1PPS) signal. A 1PPS signal is used to control the starting edge of the pilot code at each BS. Because of oscillator offset and Doppler shift, there is some residual frequency between the received signal frequency and the frequency of the local oscillator used to down-convert the received CDMA signal. This residual frequency is not completely compensated for in the CDMA receiver and requires a signal acquisition process. The acquisition process is a 2-dimensional search in both frequency and time in order to compensate for a residual frequency offset and to determine time delay between transmitter and receiver.

Figure 11:
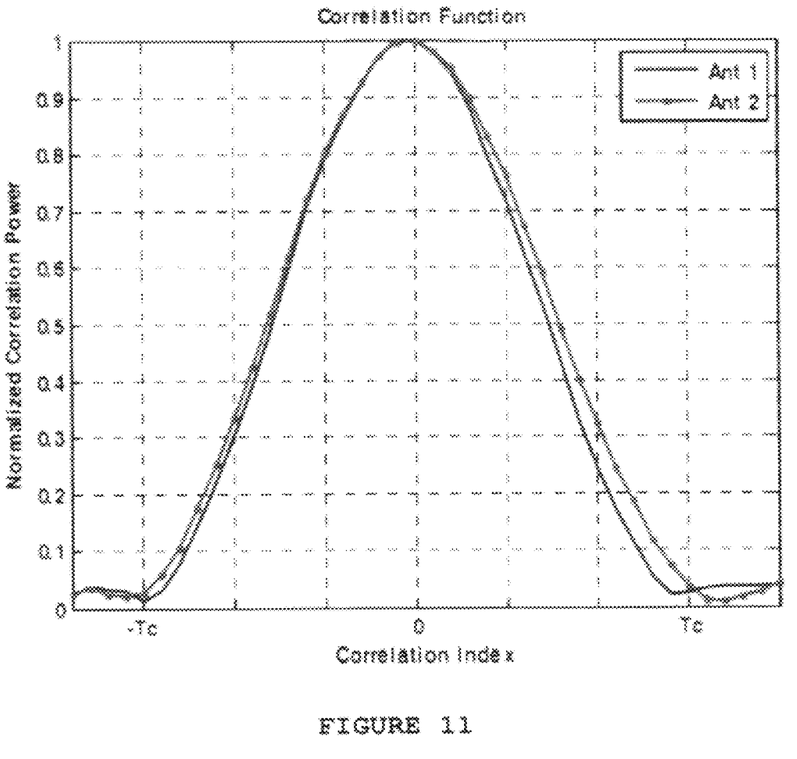
FIG. 11 shows the normalized correlation function after calibration when the antenna array was perpendicular to the calibration source.

As noted above, calibration is a useful stage for utilizing high-resolution AOA estimation algorithms. The synthetic array implementation of the ESPRIT algorithm consists of a two-channel receiver. Due to utilizing different components in different channels, each channel has distinctive phase and gain response. Experimental results have shown that the ESPRIT algorithm, in contrast to the MUSIC angle estimator, is not sensitive to gain errors. Therefore, only phase calibration or equalization will suffice. A simple and practical phase estimator to equalize the phase imbalance between channels can be used. In the AOA estimation concept, directions of incident signals are estimated based on the phase difference among different antennas. Therefore, the relative phase of sensors with respect to the calibration point is important while the absolute phase of each channel is not. Based on this concept, in one experimental setup, a two-channel receiver was placed on the roof of a building that has access to the line of sight signals from a CDMA BS. We have assumed that the phase differences among channels are angle independent. The maximum likelihood phase estimator is used to calculate the phase of each channel at the output of the correlation function. The resulting calculation is as follows:

$$\phi_i = \tan^{-1}\left\{\frac{\text{imag}(x_i)}{\text{real}(x_i)}\right\} \quad i = 1, 2 \tag{32}$$

where $\phi_i$ is the estimated phase at the output of each channel and $x_i$ is the received signal from ith sensor after a de-spreading process. The calibration process equalizes the phase differences respect to the calibration source. For example, if the array is perpendicular to the calibration source, in the ideal case, different channels have to receive impinging signals with the same phase. The phase calibration process compensates for this phase difference with respect to a reference channel. FIG. 11 represents the normalized correlation function after calibration when the antenna array was perpendicular to the calibration source.

High-resolution sub-space based AOA estimation algorithms rely on an estimation of signal sub-space (or equivalently noise sub-space). In the ideal case, M-K smallest eigenvalues of the correlation matrix are all the same and equal to $\sigma^2$. Based on this fact, the signal/noise sub-space can be easily found. However, in practice the correlation matrix is estimated by the finite number of samples. In such a case, it is probably that all eignevalues of correlation matrix become different such that it is difficult to distinguish the dimensionality of signal sub-space. Simulation results have revealed the importance of correct signal subspace size estimation. A principle based on the Akaike's Information Criterion (AIC) may be used to estimate signal subspace size.

It should be noted that the AOA estimation can be improved by using a gyro or rate gyro to monitor the direction of the position vector between the two antennas of the receiver (the doublet). The output of the gyro could be used as an input to a compensating process that allows for small deviations in direction. The gyro output could also be used in a feedback to the user as to the quality of the trajectory (stability of the antenna orientation during the trajectory). Finally, the output of the gyro can be used as an input to a mechanical stabilizing device that would maintain the directional vector between the two antennas for the duration of the trajectory.

As one aspect of the invention involves spatially translating the antenna (or antennas) through a trajectory, a velocity sensor may be used as a sensor to provide an approximate indication of the trajectory velocity with time. Such a sensor could be realized based on MEMS accelerometers as mentioned above. The velocity sensor together with the single antenna provides necessary input to the processing to achieve the desired performance.

It should be noted that any useful data processing means may be used with the invention. As such, ASICs, FPGAs, general purpose CPUs, and other data processing devices may be used, either as dedicated processors for the calculations or as general purpose processors for a device incorporating the invention. The invention may be used to enhance currently existing parameter estimation hardware or software as the invention seeks to provide statistical variety to the samples used for parameter estimation.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for determining at least one parameter of an incoming wireless signal, the system comprising:
   at least one antenna;
   at least one sensor;
   a clock for providing a clock signal;
   and data processing means;
   wherein
   said at least one antenna is spatially translated in a random trajectory, based on stochastic parameters;
   said data processing means samples data from said incoming signal at intervals based on said clock signal as said at least one antenna is spatially translated through said random trajectory;
   and
   said data processing means for determining said at least one parameter of said incoming signal based on said samples data and input from said at least one sensor and based on underlying parameters of said random trajectory such that said at least one antenna is configured to act as an antenna array;
   said system is configured for estimating one of: a propagation delay of said signal, an angle of arrival of said signal and a time of arrival of said signal.

2. The system according to claim 1 wherein said at least one antenna comprises two antennas.

3. The system according to claim 2 wherein said system is used in a method for estimating an angle of arrival of said incoming signal, said method comprising:
   a) estimating a correlation matrix from a plurality of samples from said data processing means
   b) calculating a signals subspace dimension
   c) estimating a signal subspace $E_s$ from partitioning eigenvectors of said correlation matrix where $$E_s = \begin{bmatrix} E_{x_1} \\ E_{x_2} \end{bmatrix}$$

d) computing eigenvectors of $$\begin{bmatrix} E_{x_1}^* \\ E_{x_2}^* \end{bmatrix} [E_{x_1} \mid E_{x_2}] = E\Lambda E^*$$

e) partitioning E where $$E = \begin{bmatrix} E_{11} & E_{12} \\ E_{21} & E_{22} \end{bmatrix}$$

f) estimating eigenvectors of $\hat{\phi}$ or $\Phi = E_{12} E_{22}^{-1}$
   g) estimating said angle of arrival as $$\hat{\theta}_k = \sin^{-1}\left\{\frac{\arg(\hat{\varphi}_k)\lambda}{2\pi d}\right\}$$

where θ is said angle of arrival of said incoming signal relative to a connection vector between said two antennas and λ is a wavelength of said incoming signal, and d is a displacement of said two antennas between samples.

4. The system according to claim 1 wherein said system is used in a method for estimating a time of arrival for said incoming signal by determining a correlation function between a transmitter and a receiver, said method comprising:
   a) estimating a signal space dimension
   b) estimating a steering matrix based on blind fourth order cumulants
   c) steering a main beam of a beamformer to a first estimated steering vector and placing nulls in directions of other estimated steering vectors
   d) repeating step c) for all estimated steering
   e) comparing all possible correlation functions in steps c) and d) and selecting a correlation function with minimum propagation delay as an incoming signal.

5. The system according to claim 1 wherein said system is used to detect said incoming signal.

6. The system according to claim 1 wherein said system is in a handheld form factor.

7. The system according to claim 1 wherein an output of said at least one sensor is used to determine data related to said trajectory.

8. The system according to claim 2 wherein an output of said at least one sensor is related to a vector between said two antennas.

9. A system for estimating at least one parameter of an incoming signal, the system comprising:
   two antennas for receiving said incoming signal
   a clock for providing a clock signal
   data processing means for processing data from said incoming signal to estimate said at least one parameter
   wherein
   said incoming signal is sampled by said data processing means in specific predefined intervals, said intervals being based on said clock signal
   said two antennas are spatially translated in any random trajectory while said incoming signal is being sampled and
   said data processing means for estimating said at least one parameter of said incoming signal based on samples data and based on underlying parameters of said random trajectory such that said two antennas are configured to act as a single antenna array;
   said system is configured for estimating one of: a propagation delay of said signal, an angle of arrival of said signal and a time of arrival of said signal.

10. The system according to claim 9 wherein said system is used in a method for estimating a time of arrival for said incoming signal by determining a correlation function between a transmitter and a receiver, said method comprising:
   a) estimating a signal space dimension
   b) estimating a steering matrix based on blind fourth order cumulants
   c) steering a main beam of a beamformer to a first estimated steering vector and placing nulls in directions of other estimated steering vectors
   d) repeating step c) for all estimated steering
   e) comparing all possible correlation functions in steps c) and d) and selecting a correlation function with minimum propagation delay as an incoming signal.

11. The system according to claim 9 wherein said system further comprises at least one sensor, said sensor being for determining characteristics of said trajectory.

12. The system according to claim 9 wherein said system is used in a method for estimating an angle of arrival of said incoming signal, said method comprising:

a) estimating a correlation matrix from a plurality of samples from said data processing means
b) calculating a signal's subspace dimension
c) estimating a signal subspace $E_s$ from partitioning eigenvectors of said correlation matrix where $$E_s = \begin{bmatrix} E_{x_1} \\ E_{x_2} \end{bmatrix}$$

d) computing eigenvectors of $$\begin{bmatrix} E_{x_1}^* \\ E_{x_2}^* \end{bmatrix} [E_{x_1} \mid E_{x_2}] = E\Lambda E^*$$

e) partitioning E where $$E = \begin{bmatrix} E_{11} & E_{12} \\ E_{21} & E_{22} \end{bmatrix}$$

f) estimating eigenvectors of $\hat{\varphi}_k$ of $\Phi = -E_{12}E_{22}^{-1}$
g) estimating said angle of arrival as $$\hat{\theta}_k = \sin^{-1}\left\{\frac{\arg(\hat{\varphi}_k)\lambda}{2\pi d}\right\}$$

where θ is said angle of arrival of said incoming signal relative to a connection vector between said two antennas and λ is a wavelength of said incoming signal, and d is a displacement of said two antennas between samples.

13. The system according to claim 10 wherein said method further comprises using only one of said two antennas to receive said incoming signal.

14. The system according to claim 9 wherein said system is used to detect said incoming signal.

15. The system according to claim 9 wherein said system is in a handheld form factor.

* * * * *